United States Patent [19]

Beuchel et al.

[11] Patent Number: 5,444,748
[45] Date of Patent: Aug. 22, 1995

[54] GRID STRUCTURE FOR SUPPORTING FUEL RODS IN A NUCLEAR REACTOR

[75] Inventors: Peter H. Beuchel; Yu C. Lee; James A. Sparrow, all of Columbia, S.C.

[73] Assignee: Westinghouse Electric Corporation, Pittsburgh, Pa.

[21] Appl. No.: 222,065

[22] Filed: Apr. 4, 1994

[51] Int. Cl.⁶ ............................................. G21C 3/34
[52] U.S. Cl. ................................. 376/438; 376/442; 376/439; 376/462; 376/448
[58] Field of Search .............. 376/438, 442, 439, 462, 376/448; 976/DIG. 80, DIG. 81, DIG. 77

[56] References Cited

U.S. PATENT DOCUMENTS

| | | | |
|---|---|---|---|
| 3,379,617 | 4/1968 | Andrews et al. | 376/442 |
| 3,379,619 | 4/1968 | Andrews et al. | 376/439 |
| 3,833,471 | 9/1974 | Chetter | 376/442 |
| 3,920,515 | 11/1975 | Ferrari et al. | 376/442 |
| 3,933,584 | 1/1976 | Litt | 376/439 |
| 4,175,003 | 11/1979 | Beuchel et al. | 376/442 |
| 4,268,356 | 5/1981 | Kmonk et al. | 376/442 |
| 4,389,369 | 6/1983 | Bryan | 376/442 |
| 4,521,374 | 6/1985 | Duncan | 376/442 |
| 4,578,240 | 3/1986 | Cadwell | 376/441 |
| 4,585,616 | 4/1983 | DeMario et al. | 376/442 |
| 4,659,541 | 4/1987 | Rylatt | 376/442 |
| 4,659,542 | 4/1987 | Kerrey | 376/442 |
| 4,692,302 | 9/1987 | DeMario et al. | 376/439 |
| 4,702,881 | 10/1987 | Weiland et al. | 376/442 |
| 4,803,043 | 2/1989 | DeMario et al. | 376/442 |
| 4,839,136 | 6/1989 | Demario et al. | 376/462 |
| 4,885,127 | 12/1989 | Yokoyama | 376/462 |
| 4,895,698 | 1/1990 | DeMario | 376/442 |
| 4,918,710 | 4/1990 | Bard | 376/438 |
| 4,923,669 | 5/1990 | Demario | 376/442 |
| 4,957,697 | 9/1990 | Wada | 376/442 |
| 5,096,660 | 3/1992 | Hembjer et al. | 376/438 |
| 5,271,054 | 12/1993 | Bryan | 376/443 |

*Primary Examiner*—Donald P. Walsh
*Assistant Examiner*—Meena Chelliah

[57] ABSTRACT

Disclosed is a grid structure for supporting fuel rods in a nuclear reactor. The grid structure is formed of a plurality of interconnected thin metal grid straps that are welded or brazed together to provide a structural network of interconnected open grid cells, similar to an "egg crate divider". The grid straps are provided at regular intervals, corresponding to the width of a grid cell, with pairs of spaced, substantially horizontal, slotted spring-like projections and a substantially X-shaped spring-like projection vertically intermediate the horizontal projections. The spring-like projections are designed to support and hold the fuel rods within the grid cells under both balanced and unbalanced forces acting on the fuel rod assembly while it is in service, surrounded by coolant in the nuclear reactor.

4 Claims, 4 Drawing Sheets

GRID STRUCTURE FOR SUPPORTING FUEL RODS IN A NUCLEAR REACTOR

BACKGROUND OF THE INVENTION

This invention relates to nuclear reactors. It relates particularly to a grid structure used for supporting and retaining the fissionable fuel rods used in a nuclear reactor core.

Most nuclear reactors use as fuel, elongated rods of fissionable material arranged and supported in a spaced, parallel array between upper and lower core support plates. To provide integrity within the supports, the fuel rods are divided into groups and the fuel rods in each group are formed as an integral fuel rod assembly prior to placement between the reactor core support plates.

More specifically, the fuel rods in each group have been in the past typically arranged in spaced, parallel arrangement with each other in supporting and spacing frames or grids. The grids are formed of a plurality of interconnected metal grid straps to provide a structural network of interconnected open grid cells, similar to an "egg crate divider".

U.S. Pat. Nos. 3,379,617 and 3,379,619 issued Apr. 23, 1968 to Andrews et al. and assigned to the assignee of the present invention, describe several previously known designs for grid structures used to support and retain fuel rods and associated tubular fuel rod thimbles within selected cells or openings in the grid structure by resilient, spring-like retainers. U.S. Pat. No. 3,379,617 to Andrews et al., in particular, discloses using dimples and slotted projections to align and retain the fuel rod in the center of an open grid cell.

It has been observed in practice that the prior fuel rod grid support structures did not always hold the fuel rod in the desired alignment during service, especially during variations in the pressure or flow of the cooling water used to surround the fuel rod assemblies in the nuclear reactor core due to unbalanced forces and bending moments produced in the fuel assemblies. It certain situations, the pressure and flow of the cooling water could produce oscillatory motion of the fuel rod assemblies which not only caused a change in alignment but could easily cause a fretting wear of the protective cladding of the fuel rods.

Due to extended fuel service life, it is anticipated that the dimples and other spring-like retainers used in prior grid structures to retain and support the fuel rods in the grid cells are subject to fatigue cracking. Normally, replacement of the entire fuel assembly support structure is needed to prevent any possible fatigue failure of the fuel rod support systems. Such replacements are costly and require additional maintenance time during refueling operations to prevent possible fatigue failures.

SUMMARY OF THE INVENTION

It is therefore an object of this invention to provide a grid structure for a nuclear reactor fuel assembly that will hold the fuel rods in the desired alignment and position, even during substantial changes in the pressure or flow of the cooling water which surrounds the fuel assembly.

It is a further object of this invention to provide a grid structure for a nuclear reactor fuel assembly that will hold the fuel rods in the desired alignment and position even when the grid structure is subject to unbalanced forces and bending moments.

It is a still further object of this invention to provide a grid structure for a nuclear reactor fuel assembly that will improve the flow of cooling water within the grid structure and around the fuel rods held within the grid structure.

It is another object of this invention to provide a grid structure for a nuclear reactor fuel assembly that is easy to manufacture and can be easily adapted for existing nuclear reactor fuel assemblies.

DESCRIPTION OF THE PREFERRED EMBODIMENTS

Figure 1:
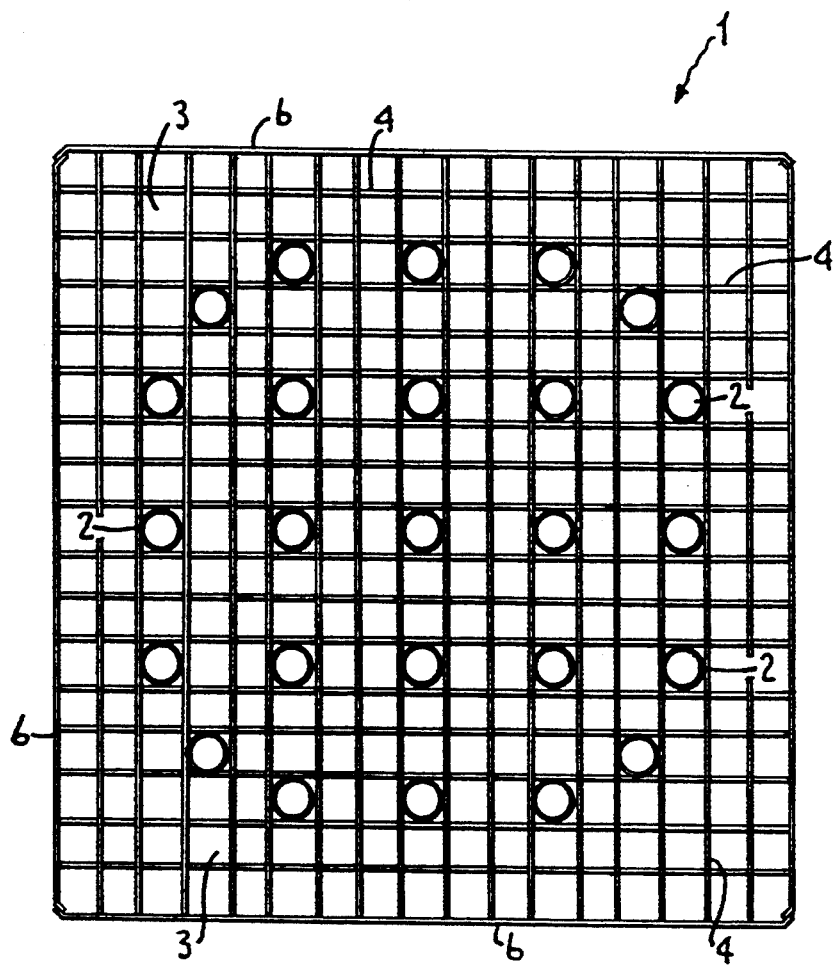
FIG. 1 is a top view of a grid structure of this invention for a nuclear fuel assembly.

FIG. 1 illustrates a top view of a grid structure 1 of this invention for a nuclear fuel assembly illustrating a plurality of fuel rods 2 retained within selected grid cells 3 of the grid structure 1.

Figure 2:
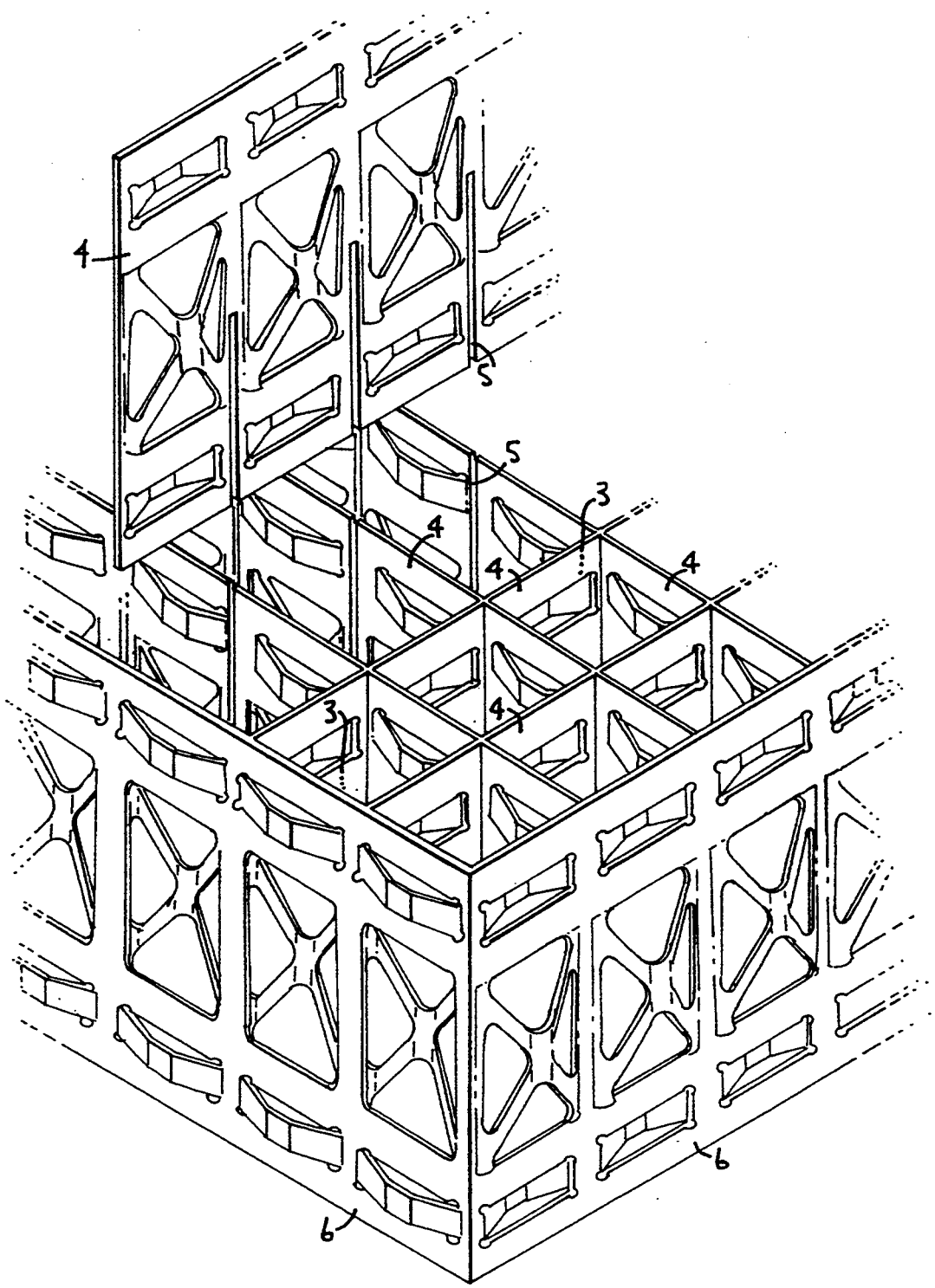
FIG. 2 is a partial isometric view of a grid structure of this invention for a nuclear reactor fuel assembly, illustrating several of the grid cells and the interconnection of the grid straps used in the construction of the grid structure.

FIG. 2 is a partial isometric view of the grid structure 1 of this invention illustrating several of the grid cells 3 and the interconnection of the grid straps 4 used in the construction of the grid structure 1. As illustrated in FIGS. 1 and 2, the grid structure 1 is comprised of a plurality of interconnected thin metal grid straps 4 made of a zirconium alloy, Inconel or a stainless steel to provide a structural network of interconnected square or rectangular grid cells 3, similar to a cardboard "egg crate divider". Slots 5, which extend about one-half the width of the grid straps 4 and spaced at regular intervals along the length of the grid straps 4 allow one group of parallel grid straps 4 to intersect at right angles and interconnect with a second group of similarly slotted parallel grid straps 4 and thereby form a series of interconnected, rectangular or square, open-ended grid cells 3 as illustrated in FIG. 1. The interconnected grid straps 4 are provided with border grid straps 6 that form the periphery of the grid structure 1 and are connected to the ends of the individual grid straps 4. After assembly, the grid straps 4 and 6 are welded or brazed together to form an integral and structurally strong grid structure 1.

Figure 3:
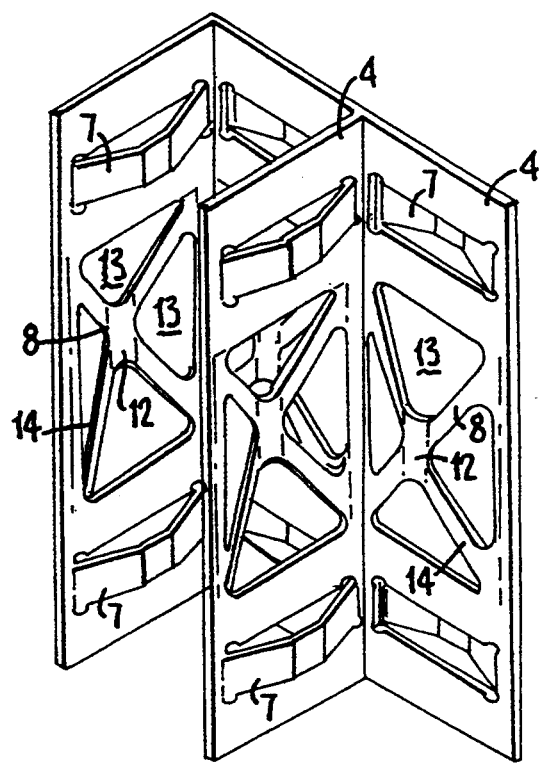
FIG. 3 is a partial isometric view of single grid cell of this invention, illustrating the arrangement of the spring-like projections formed in the walls of the grid cells which are used to support and retain the fuel rods.
Figure 4:
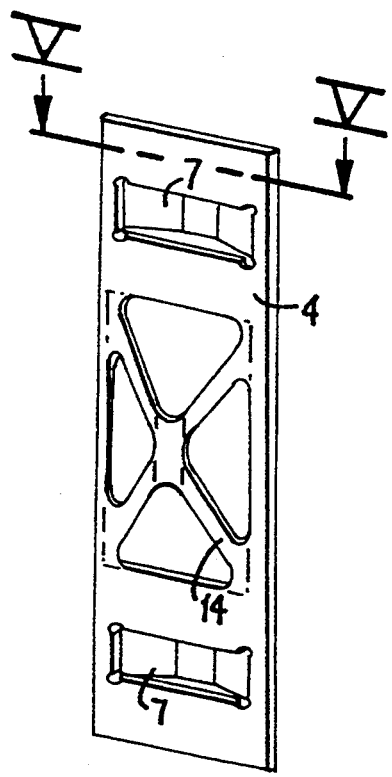
FIG. 4 is an isometric view of a typical single wall of a grid cell of this invention.
Figure 5:
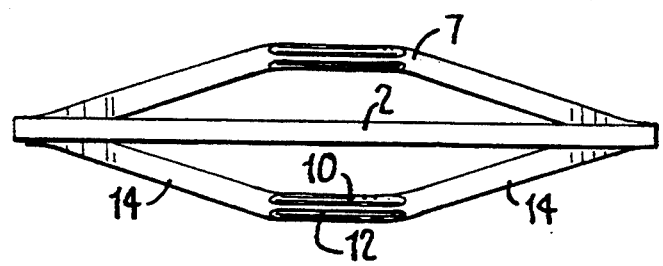
FIG. 5 is a sectional view taken along Section Line V—V shown in FIG. 4.

As illustrated in FIGS. 2, 3 and 4, the grid straps 4 are provided with at regular intervals, corresponding to the width of a grid cell 3, with pairs of spaced, substantially horizontal, slotted spring-like projections 7 and a substantially X-shaped spring-like projection 8 intermediate of the spaced, substantially horizontal, slotted spring-like projections 7. As best illustrated in FIGS. 4 and 5, the horizontal, slotted spring-like projections 7 project from one face of a particular grid strap 4 while the substantially X-shaped spring-like projections 8 project from the other face of the particular grid strap 4.

As best illustrated in FIG. 3, once the grid straps 4 of this invention have been interconnected to form the grid structure 1 and the grid cells 3, each grid cell 3 will have two walls of a grid cell 3 each having a pair of the spaced, substantially horizontal, slotted spring-like projections 7 projecting into that grid cell 3 and the other two walls of that grid cell 3 each having one of the X-shaped spring-like projections 8 projecting into that cell vertically intermediate of the spaced, substantially horizontal slotted spring-like projections 7, whereby a fuel rod 2 may be supported and retained in the grid cell 3 by contact with four of the horizontal slotted spring-like projections 7 and two of the X-shaped spring-like projections 8.

The combination of horizontal spring-like projections 7 and the diagonal legs 14 of the X-shaped spring-like projections 8 are able to resist any unbalanced forces or vibrations developed in the fuel assembly support structures due to changes in the cooling water pressure or flow and will continue to tightly hold the fuel rods 2 in the proper alignment without movement during such situations. The horizontal slotted spring-like projections 7 are placed with the slot perpendicular to the substantially vertical flow of the coolant in the reactor core and produce a much more efficient flow of the coolant with less pressure drop than in previous designs. The X-shaped spring like projections 8 greatly reduce the possibility of unbalanced twisting torque forces or vibrations being produced in the grid cells 3 due to the fact that with the design of this invention half of the spring-like projection 8 is diagonally moving from the left side of the projection 8 opening while the other half of the spring-like projection 8 is diagonally moving from the right side of the projection 8 opening which tends to reduce any unbalanced radial torque forces in the grid structure. The design of the spring-like projections 7 and 8 provide constant and accurate spring rates and deflections throughout the service life of the grid structure 1 and prevent a fretting wear of the protective cladding of the fuel rods.

As illustrated in FIGS. 3 and 4, the portions of the projections 7 and 8 adjacent to the planar surface of the grid strap 4 are all provided with circular or curvilinear cut-outs 9 that provide areas of stress relief in the grid straps 4 and projections 7 and 8 and prevent premature fatigue cracking of the projections 7 and 8.

As illustrated in FIG. 5, the top and bottom edges 10 and 11 of the central portion 12 of the substantially X-shaped spring-like projections 8 are chamfered or coined thinner in thickness to facilitate the insertion and removal of the fuel rods 2 in the grid cells 3 and to reduce the hydraulic resistance of this central portion 12 to the flow of the coolant in the reactor core.

As also illustrated in FIGS. 4 and 5, the X-shaped spring-like projections 8 have substantially triangular cut-outs 13 formed around each of the four legs 14 of the X-shaped projections 8 to allow an increased flow of coolant to enter the grid cell 3 and cool the exterior of the fuel rod 2 retained in the grid cell 3.

We claim:

1. A grid structure for a nuclear reactor fuel assembly comprising a plurality of interconnected metal straps forming the walls of a plurality of rectangular open cells adapted to receive and retain a plurality of vertically disposed, elongated fuel rods, two walls of a cell each having a pair of spaced, substantially horizontal spring-like projections projecting into said cell, the other two walls of said cell each having a substantially X-shaped spring-like projection also projecting into said cell vertically intermediate of said spaced, substantially horizontal projections, whereby an elongated fuel rod may be supported and retained in said cell by said projections.

2. The grid structure of claim 1 in which the edges of the central portion of the X-shaped spring-like projections are chamfered.

3. The grid structure of claim 1 in which the portions of the projections adjacent to the planar surface of the strap are provided with curved stress relief cut-outs.

4. The grid structure of claim 1 in which substantially triangular portions of the grid strap are cut-out around each of the four legs of the X-shaped spring-like projections.

* * * * *